3,378,536
POLYMERIZATION PROCESS USING A CATALYST COMPRISING A SUPPORTED DIARENE METAL AND SUPPORTED CHROMIUM OXIDE
Darrell W. Walker and Grant C. Bailey, Bartlesville, Okla., assignors to Phillips Petroleum Company, a corporation of Delaware
No Drawing. Continuation-in-part of application Ser. No. 332,260, Dec. 20, 1963. This application Sept. 24, 1964, Ser. No. 399,097
16 Claims. (Cl. 260—88.2)

This is a continuation-in-part application of our copending application Ser. No. 332,260, filed Dec. 20, 1963, and now abandoned.

This invention relates to a process for preparing ethylene polymers of high shear response.

One of the most critical variables in ethylene polymers is the shear sensitivity of the polymer, By shear sensitivity is meant the sensitivity of shear rate with changes in shear stress applied to the molten polymer. This property is also referred to as shear response, that is, the response of shear rate to changes in shear stress.

Shear reponse of the polymer is largely a function of molecular weight distribution; the narrower the distribution, the less the change in shear rate with change in applied shear stress. Conversely, the wider the molecular weight distribution in a polymer, the greater is its shear response which is reflected in increased processability of that polymer for a wide range of applications. The fabrication of polyethylene bottles is an example of an application where a high shear response polymer is particularly advantageous.

One convenient means for expressing the breadth of the molecular weight distribution of a polymer is by the ratio of its high load melt index to its regular melt index. The melt index determination is convenient (ASTM D 1238:regular melt index according to condition E, high load melt index according to condition F) and consequently such a ratio is used throughout this disclosure as a measure of molecular weight distribution and shear response. Although this technique does not result in absolute values, it nevertheless provides easily obtainable values that are related and proportional to the molecular weight distribution and are, therefore, useful for the evaluation and comparison of polymers. Thus, higher ratios for high load to regular melt index show higher shear response and, conversely, lower ratios show lower shear response.

Accordingly, the principal object of the invention is to provide a process for preparing high shear response homopolymers and copolymers of ethylene. Another object is to prepare polymers and homopolymers of ethylene having improved processability. A further object is to provide an ethylene polymerization process which affords better temperature control in producing a polymer of a selected melt index. Other objects of the invention will become apparent upon consideration of the accompanying disclosure.

The production of ethylene polymers over suitably supported chromium oxide catalysts is well described in U.S. Patent 2,825,721 issued to John Paul Hogan and Robert L. Banks. It has now been found that the addition of a diarene chromium and/or diarene vanadium compound to the polymerization system of Hogan and Banks results in the production of polymers which have still greater value in many applications. The chromium oxide portion of the catalyst system of this invention is described in the above mentioned patent. In general, this composite is prepared by depositing chromium oxide, or a chromium compound convertible to the oxide on calcination, on supports such as silica, alumina, zirconia, thoria, or combinations of these. The catalyst is activated by heating at elevated temperatures in the range of about 750 to 1500° F. in the presence of dry air or similar $O_2$-containing gas.

A catalyst system comprising a supported chromium oxide and a diarene chromium and/or vanadium compound has been found to produce an ethylene polymer having a high shear response and improved processability as indicated by its broad molecular weight distribution.

It has also been found that the pre-treatment of the supported chromium oxide component of the catalyst system with carbon monoxide before use in the ethylene polymerization process additionally improves the shear response of the resulting polymer.

In addition to the improved shear response benefit obtained by the use of the catalyst system of the present invention with CO pre-treatment of the solid component, there is still another advantage which relates to the convenience and efficiency of the polymerization process itself. When using a vanadium diarene compound in the present catalyst system, it has been found that a higher operating temperature can be used to produce a polymer of a given melt index.

The melt index (indicative principally of the molecular weight of a polymer) is closely proportional to the reaction temperature; lower temperatures producing polymer with a low melt index (high molecular weight) and higher temperatures producing polymer with a high melt index (low molecular weight). Thus, a polymer can in general be produced having a specific melt index which is suitable for its intended application, be it for pipe, film, bottles, or the like. Operationally speaking, however, it is desirable to operate at the highest reaction temperature which will produce polymer having the required melt index. This high reaction temperature is desirable because it provides the largest temperature differential, and therefore the best heat transfer, between the inner reactor wall in contact with the reaction mixture and the outer reactor wall on contact with the coolant. Olefin polymerization reactions are exothermic and heat must be carried away, but the coolant temperature must not be so low that it will cause polymer to deposit upon the inner walls of the reactor. Consequently, polymerization processes utilizing higher reaction temperatures permit more effective cooling of the reaction mixture without danger of losing control of the process.

A broad aspect of the invention comprises polymerizing ethylene, alone, or in admixture with minor proportions of 1-olefins of 3 to 8 carbon atoms per molecule, such as propylene, 1-butene, 1-pentene, 1-hexene, 4-methyl-1-pentene, 1-octene, and the like, as well as conjugated diolefins such as butadiene and isoprene in contact with solid particulate supported chromium oxide catalyst and diarene chromium and/or vanadium under conventional polymerizing conditions. Another aspect of the invention comprises treating the supported solid chromium oxide catalyst in a carbon monoxide ambient after the usual activation in air.

The diarene chromium and/or diarene vanadium (sometimes called bisarene) portion of the catalyst system includes compounds having the following structure:

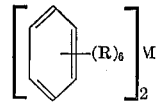

wherein M represents one of the metals Cr and V, and R is selected from the group consisting of hydrogen, alkyl, cycloalkyl, and aryl radicals having 1 to 20, inclusive, carbon atoms per molecule and combinations thereof. Some examples are: dibenzene chromium, ditoluene chromium, di-o-xylene chromium, di-p-xylene chromium, dicumene chromium, dimesitylene chromium, di(n-propylbenzene) chromium, di(1,3,5-triethylbenzene) chromium, di(1,3-diethyl-4-hexylbenzene chromium, di(1,3,5-trihexylbenzene) chromium, di(hexamethylbenzene) chromium, di(1-isobutyl-4 - phenylbenzene) chromium, di(p-tolylbenzene) chromium, di(1,3,5-triphenylbenzene) chromium, di[(4-tetradecylphenyl)benzene] chromium, di(1-cyclohexyl - 3,4,5 - trimethylbenzene) chromium, di[(2,5-dimethylcyclohexyl)benzene] chromium, di[1,3,5-tri(9,9-dimethyl - 10 - phenyldecyl)benzene] chromium, di(1,3,5-trieicosylbenzene) chromium, di[1,4-di(4-isopropyl-2,5-diethylbenzyl)benzene] chromium, and the like, and the corresponding vanadium compounds.

The amount of diarene compound used in the catalyst system is dependent upon the amount of chromium present in the inorganic portion of the catalyst system. In general, sufficient diarene chromium or diarene vanadium will be used to provide a molar ratio of diarene metal to supported chromium metal in the range of about 0.1 to about 20 and preferably from about 0.25 to about 5. The ratio is calculated on a metal to metal basis although, in reality, the metals are actually present in the form of organic or inorganic compounds. Expressed in weight percent, the Cr added to the supported chromium oxide composite is in the range of 0.01 to 10 and, preferably, 0.1 to 1.0.

The diarene metal compounds utilized in accordance with this invention are preferably supplied to the reaction zone as a stream separate from the chromium oxide containing solid catalyst. They can be premixed with the solid catalyst but, in such case, it is preferred that the organometal not be allowed to remain in contact with the chromium oxide catalyst in the absence of reactive monomer for more than a few minutes.

Except for the diarene metal addition and the treatment of the solid chromium oxide catalyst with CO, the polymerization process of this invention is carried out conventionally such as described in the previously mentioned Hogan and Banks patent. In general, the olefin charge and catalyst are contacted at a temperature of 150–450° F. and at a pressure of 0–2000 p.s.i.g. The reaction time will range from about 0.1 minute to about 10 hours, preferably 0.5 to 5 hours. The process may be carried out in the presence or absence of a diluent. However, a diluent is preferred and materials such as cyclohexane or isooctane are frequently used for this purpose in amounts of 1–100 parts diluent per part of polymerizable monomer by weight. Any conventional polymerization technique including operation with a stirred batch reactor, a continuous fixed catalyst bed system, or a continuous suspended catalyst system can be used. In whichever technique is used, the rate of olefin addition will depend to a significant degree upon the initial amount of catalyst charged or on the addition rate of catalyst if the system is continuous. The amount of catalyst used will depend upon the desired rate of polymer production and on the capacity of the polymerization equipment, particularly in regard to its ability to conveniently dissipate the heat of reaction. In general, the catalyst in the reaction zone will be present in an amount from about 0.01 to 10 weight percent of the monomer present.

The catalyst system and process of this invention are applicable to the preparation of polyethylene and its copolymers which comprise greater than about 75 mole percent combined ethylene. Such copolymers can be prepared from monomer mixtures which contain, the addition to ethylene, 3 to 8 carbon containing 1-olefins such as propylene, 1-butene, 1-pentene, 1-hexene, 4-methyl-1-pentene, 1-octene, and the like, as well as such conjugated diolefins as butadiene and isoprene. However, the invention is particularly valuable in the preparation of homopolymers of ethylene.

To achieve the full benefits of the present catalyst system, the supported chromium oxide component should be treated with carbon monoxide after its conventional activation with air. This treatment is effected in the temperature range of 300–1000° F., preferably within the range of 375 to 675° F. The length of time for this treatment can vary considerably while still resulting in an improvement in catalyst activity but it is preferred, however, that the treatment period be limited to the range of about 10 to about 30 minutes. Pure carbon monoxide can be used for the treatment but it is generally preferred that it be diluted with an inert gas such as helium, nitrogen, argon, and the like. The gas, however, should contain at least 10 volume percent of carbon monoxide. The carbon monoxide-containing gas, like the activating gas, should be essentially anhydrous. Any method of gas-solids contacting can be employed, for example, with the catalyst in a stationary or fluidized bed.

The invention is further illustrated by the following examples:

EXAMPLE I

Several ethylene polymerizations were carried out in a 1.3-liter stirred stainless steel reactor which contained 0.75 pound of commercial cyclohexane diluent in each run. The solid catalyst used in each case was a microspheroidal silica upon which was deposited 0.35 weight percent chromium oxide (calculated as the metal but present as the oxide) based on the weight of the silica. The polymerization runs were 1 hour in length and were carried out at 300° F. and 450° p.s.i.g. After each run the polymer produced was isolated by evaporating the diluent and further drying the solid polymer in an oven. In three of the runs, dicumene chromium was added in a cyclohexane solution which contained 0.01035 g. chromium (calculated as the metal) per cc. of solution. The charging order of the batch reactor was as follows: solid catalyst, solvent, dicumene chromium solution, ethylene. The results of the runs are seen in the following table:

| Run | 1 | 2 | 3 | 4 |
| --- | --- | --- | --- | --- |
| Dicumene chromium added, Molar ratio Cr/Cr | 0 | 0.96 | 2.1 | 2.96 |
| Cr wt. percent of supported composite | 0 | 0.34 | 0.74 | 1.04 |
| Solid catalyst per run, g | 0.1310 | 0.1543 | 0.1400 | 0.1500 |
| Productivity, g./g./hr | 435 | 437 | 560 | 385 |
| Melt index (MI) | 0.33 | 0.30 | 0.45 | 0.51 |
| High load melt index (HLMI) | 25.5 | 24.1 | 43.7 | 52.2 |
| Ratio: HLMI/MI | 77 | 80 | 97 | 102 |

From examination of the preceding table it is seen that the addition of dicumene chromium to a chromium oxide initiated ethylene polymerization process is effective in increasing the shear response of the product polymer. As mentioned earlier, the ratio of high load melt index to regular melt index is indicative of the molecular weight distribution and, hence, of the shear response of the polymer. Thus it is seen, that those polymers produced in the presence of biscumene chromium are superior, in shear response, to the polymer produced in the absence of such an organometal. Diarene vanadium compounds substituted for or used in addition to diarene chromium in the catalyst system have a similar effect on the shear response and processability.

EXAMPLE II

Several ethylene polymerizations were carried out in a stirred steel reactor having a capacity of about 1 liter. Cyclohexane diluent was used in each polymerization run. The solid catalyst used in each case was a microspheroidal silica upon which was deposited 0.7 weight percent chromium oxide (calculated as metal but present as the oxide) based on the weight of the silica. This solid portion of the catalyst was activated at 1200° F. in air. For those runs utilizing a carbon monoxide treatment, this activated catalyst was further subjected to contact with a stream containing 50 volume percent carbon monoxide in nitrogen. The contact with carbon monoxide was made at a temperature of 575° F. and was continued for 20 minutes. Dibenzene vanadium was the organometal used. It was separately injected into the reactor in a cyclohexane solution.

The polymerization runs were carried out at 450 p.s.i.g., 325° F., for a period of one hour. At the end of the reaction period the reactor was vented, the polymer was recovered and dried of volatile material, and the melt index of the polymer was determined by conventional methods. The results of the tests are shown in the table below.

ETHYLENE POLYMERIZATION

| Solid Catalyst Activation | Molar V/Cr Ratio | Production Rate, g./g.-hr. | MI | HLMI | HLMI/ MI |
|---|---|---|---|---|---|
| Air (328° F.)* | 0 | 588 | 5.08 | 267 | 53 |
| Air and CO | 0 | 1,176 | 4.27 | 175 | 41 |
| Air | 1.25 | 837 | 2.4 | 139 | 57 |
| Air and CO | 1.25 | 982 | 1.5 | 97 | 64 |
| Air | 2.1 | 440 | 0.87 | 69 | 79 |
| Air and CO | 2.1 | 414 | 0.37 | 37 | 100 |

*Polymerization temperature for this run.

The results shown in the table above indicate that, at two different levels of dibenzene vanadium addition, the catalyst system of the present invention results in polymers of improved shear response as indicated by the ratio of high load melt index to regular melt index. In addition, the invention catalyst system using the vanadium organo-metal also results in polymers having lower melt index thus providing an opportunity to use operating temperatures which are higher, more convenient, and more efficient.

When ethylene is copolymerized with minor amounts (25 percent or less by weight of the total olefin feed) of low molecular weight olefins, such as 1-butene, in accordance with this invention, the resulting copolymers also have high shear response and improved processability.

Reasonable variations and modifications are possible within the scope of the foregoing disclosure and the appended claims to the invention.

We claim:
1. A process for polymerizing ethylene comprising the steps of:
   (1) passing an olefin feed consisting of at least 75 weight percent ethylene into an enclosed polymerizing zone;
   (2) introducing to said zone a two component catalyst system of
      (a) chromium oxide deposited on a support selected from the group consisting of silica, alumina, thoria, zirconia, and mixtures thereof;
      (b) an organic solution of diarene metal designated by the structure

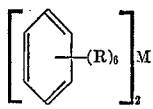

wherein M is selected from the group consisting of Cr and V, and R is selected from the group consisting of hydrogen alkyl, cycloalkyl, and aryl radicals of 1 to 20 carbon atoms and combinations thereof;
   (3) intimately contacting the feed of step (1) with the catalyst of step (2) under polymerizing conditions so as to form solid polymer; and
   (4) recovering said solid polymer.

2. The process of claim 1 wherein a hydrocarbon solvent inert in the process is maintained in said polymerizing zone and sufficient pressure is maintained therein to dissolve olefin feed in the solvent.

3. The process of claim 2 wherein the total amount of catalyst present in the polymerizing zone is in the range of 0.01 to 10 weight percent of the monomer present therein.

4. The process of claim 2 wherein the total amount of catalyst present in the polymerizing zone is in the range of 0.01 to 10 weight percent of the monomer present therein and the molar ratio of the metal in the diarene metal component to the metal in the supported chromium oxide component is in the range of 0.1 to 20.

5. The process of claim 1 wherein M is Cr.
6. The process of claim 1 wherein M is V.
7. A process comprising polymerizing ethylene in admixture with an inert liquid hydrocarbon diluent in a pressurized reactor under sufficient pressure to maintain ethylene in solution in said diluent, in contact with a two component catalyst system separately introduced to said reactor including
   (a) chromium oxide deposited on a support selected from the group consisting of silica, alumina, zirconia, thoria, and mixtures thereof, and
   (b) an organic solution in said diluent of diarene metal designated by the structure

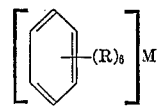

wherein M is selected from the group consisting of Cr and V, and R is selected from the group consisting of hydrogen, alkyl, cycloalkyl, and aryl radicals of 1 to 20 carbon atoms and combinations thereof so as to form solid polymer.

8. The process of claim 7 wherein a substantial amount of an olefin selected from the group consisting of 1-olefins of 3 to 8 carbon atoms per molecule, butadiene, and isoprene up to 25 weight percent of the total olefin is introduced to said reactor along with ethylene so as to form solid copolymer.

9. The process of claim 8 wherein the selected olefin is 1-butene.

10. A process comprising polymerizing ethylene in liquid phase in cyclohexane diluent in admixture with a two component catalyst of
   (a) chromium oxide deposited on a support selected from the group consisting of silica, alumina, zirconia, thoria, and mixtures thereof, and
   (b) dicumene chromium to form solid polymer, and recovering said polymer.

11. The process of claim 10 wherein 1-butene in minor proportion less than 25 weight percent of the total monomer is admixed with said diluent so as to produce copolymer.

12. A two component catalyst system consisting essentially of
   (a) chromium oxide deposited on a support selected from the group consisting of silica, alumina, zirconia, thoria and mixtures thereof, and
   (b) an organic solution of diarene metal designated by the structure

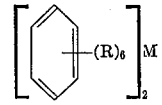

wherein M is selected from the group consisting of Cr and V, and R is selected from the group consisting of hydrogen, alkyl, cycloalkyl, and aryl radicals of 1 to 20 carbon atoms and combinations thereof, component (b) being in solution in a nonpolymerizable hydrocarbon and the amount thereof (calculated as metal) being such that the molar ratio of the metal in component (b) to the Cr in component (a) is in the range of 0.1 to 20.

13. The catalyst system of claim 12 wherein M is Cr.
14. The catalyst system of claim 12 wherein M is V.
15. The process of claim 1 wherein component (a) of the two catalyst system has been pretreated after oxidation in air by contacting the oxidized component with a gaseous ambient having a substantial concentration of carbon monoxide at a temperature in the range of 300 to 1000° F. for a period of at least 10 minutes before introduction to the polymerization zone.

16. The process of claim 7 wherein component (a) of the two catalyst system has been pretreated after oxidation in air by contacting the oxidized component with a gaseous ambient having a substantial concentration of carbon monoxide at a temperature in the range of 300 to 1000° F. for a period of at least 10 minutes.

References Cited

UNITED STATES PATENTS

| 2,825,721 | 3/1958 | Hogan | 260—94.9 |
| 3,157,712 | 11/1964 | Walker | 260—94.9 |
| 3,166,537 | 1/1965 | Gregg | 260—94.9 |
| 3,316,235 | 4/1967 | Tazima et al. | 260—94.9 |

JOSEPH L. SCHOFER, *Primary Examiner.*

F. L. DENSON, M. B. KURTZMAN,
*Assistant Examiners.*